(12) United States Patent
Brück

(10) Patent No.: US 8,491,846 B2
(45) Date of Patent: Jul. 23, 2013

(54) HONEYCOMB BODY FORMED OF METALLIC FOILS, METHOD FOR THE PRODUCTION THEREOF AND MOTOR VEHICLE

(75) Inventor: Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 185 days.

(21) Appl. No.: 12/941,136

(22) Filed: Nov. 8, 2010

(65) Prior Publication Data
US 2011/0100744 A1    May 5, 2011

Related U.S. Application Data

(63) Continuation of application No. PCT/EP2009/054921, filed on Apr. 23, 2009.

(30) Foreign Application Priority Data

May 7, 2008 (DE) .......... 10 2008 022 519

(51) Int. Cl.
*B01D 50/00* (2006.01)
(52) U.S. Cl.
USPC .......................................... 422/177
(58) Field of Classification Search
USPC .............. 422/177, 180; 428/116; 55/520, 55/521; 502/439
See application file for complete search history.

(56) References Cited

U.S. PATENT DOCUMENTS

| 4,602,001 A * | 7/1986 | Cyron ............ 502/439 |
| 4,686,155 A | 8/1987 | Kilbane et al. |
| 4,888,320 A * | 12/1989 | Ihara et al. ......... 502/304 |
| 5,173,471 A | 12/1992 | Usui et al. |
| 6,689,328 B1 * | 2/2004 | Otani et al. ......... 422/180 |
| 6,699,587 B2 | 3/2004 | Iwami et al. |
| 7,229,598 B2 | 6/2007 | Takahashi et al. |

FOREIGN PATENT DOCUMENTS

| CN | 101049577 A * | 10/2007 |
| DE | 4116904 A1 | 11/1991 |
| DE | 4403500 A1 | 8/1995 |
| EP | 0 988 892 A1 | 3/2000 |
| EP | 1251250 A1 | 10/2002 |
| EP | 1171239 B1 | 9/2003 |
| JP | 61281861 A1 | 12/1986 |
| JP | 3023309 A | 1/1991 |
| JP | 0360739 A | 3/1991 |
| JP | 8022380 B | 3/1996 |
| JP | 08196916 A | 8/1996 |
| JP | 0947666 A | 2/1997 |
| JP | 09505238 A | 5/1997 |
| JP | 11253753 A | 9/1999 |

OTHER PUBLICATIONS

International Search Report of PCT/EP2009/054921, Dated Aug. 17, 2009.

* cited by examiner

*Primary Examiner* — Tom Duong
(74) *Attorney, Agent, or Firm* — Laurence A. Greenberg; Werner H. Stemer; Ralph E. Locher

(57) ABSTRACT

A honeycomb body is formed of smooth and structured metallic foils. The smooth foils have different average roughnesses or different oxide layer thicknesses than the textured foils. A method for producing the honeycomb body and a motor vehicle having the honeycomb body, are also provided.

15 Claims, 3 Drawing Sheets

HONEYCOMB BODY FORMED OF METALLIC FOILS, METHOD FOR THE PRODUCTION THEREOF AND MOTOR VEHICLE

CROSS-REFERENCE TO RELATED APPLICATION

This is a continuation, under 35 U.S.C. §120, of copending International Application No. PCT/EP2009/054921, filed Apr. 23, 2009, which designated the United States; this application also claims the priority, under 35 U.S.C. §119, of German Patent Application No. DE 10 2008 022 519.3, filed May 7, 2008; the prior applications are herewith incorporated by reference in their entirety.

BACKGROUND OF THE INVENTION

Field of the Invention

The present invention relates to a honeycomb body formed of at least one metallic smooth foil and at least one structured foil. The invention also relates to a method for the production of a honeycomb body for use in exhaust systems of internal combustion engines, in particular in motor vehicles, and to a motor vehicle having the honeycomb body.

Metallic foils have long been used in the production of honeycomb bodies, in particular for exhaust systems of internal combustion engines. Due to the high temperatures in such applications, use is usually made of steels containing chromium and aluminum, which are particularly high-temperature corrosion resistant. In that case, typical foils have a thickness of 20 μm to 180 μm (micrometers) and are generally produced by rolling. Particularly high demands must be placed on the surface with the use of such foils for metallic honeycomb bodies and other components for exhaust-gas purification.

Honeycomb bodies are also known which have connections, in particular through the use of brazing material, between the individual metallic foils, that are only in partial regions, in such a way that the honeycomb body structure has a high degree of rigidity in certain regions and, in other regions, has a high degree of flexibility with regard to alternating loads. However, aside from the predetermined connecting partial regions which are generated by the application of brazing material, the honeycomb bodies also in part have additional connections which are generated, in particular by diffusion. The diffusion connections between the individual foils are generated, in particular during and/or after the production of the honeycomb body, as a result of the thermal treatment thereof. In that case, the tendency of the metallic surfaces of the foils to form a diffusion connection with one another is dependent, inter alia, on the roughness of the individual surfaces, which is generated substantially by the rolling process of the foils.

It is important, inter alia, for the production of the brazing connections of the metallic foils to one another, for the brazing material which is applied, for example, in powder form in certain regions, to disperse only over a small surrounding region as it flows when the melting temperature is reached. In that case, the flow and wetting conditions of a brazing material on a surface are likewise dependent on the surface roughness of the material being used.

The property of the high-temperature corrosion resistance of the foils also emerges, in particular from the fact that a protective oxide layer is formed on the surface of the foils. The oxide layer, in the case of foils including aluminum, is composed primarily of aluminum oxide, in particular of γ-(gamma-)aluminum oxide.

In general, honeycomb bodies, which are produced from metallic foils, in exhaust systems, are additionally coated with a catalytically active material, whereby the foil should have good adhesion characteristics for a washcoat of that type.

From the statements made above, it is clear that there are numerous requirements which the metallic foils must meet in order to create particularly durable honeycomb bodies. It has heretofore not been possible to solve that problem in a targeted manner for all applications of such honeycomb bodies.

SUMMARY OF THE INVENTION

It is accordingly an object of the invention to provide a honeycomb body formed of metallic foils, a method for the production thereof and a motor vehicle, which overcome the hereinafore-mentioned disadvantages and at least partially solve the highlighted problems of the heretofore-known devices and methods of this general type and which, in particular, ensure a targeted and durable connection of the foils to form a honeycomb body, in which the connection meets requirements with regard to diffusion tendency as well as wetting capability and flowability of a brazing material and is simultaneously also inexpensive to produce. Furthermore, the method should provide for the simple and effective production of a honeycomb body of that type.

With the foregoing and other objects in view there is provided, in accordance with the invention, a honeycomb body, comprising at least one metallic smooth foil and at least one metallic structured foil. The at least one smooth foil has a different mean roughness than the at least one structured foil.

In this case, the at least one metallic smooth foil and at least one structured foil are preferably produced from a steel with chromium and aluminum components, in particular from steel with an aluminum content of 1 to 5% by weight. An aluminum content of up to 5% by weight is particularly expedient for high-temperature corrosion resistance, with no significant disadvantages for the other properties of a metallic foil.

In order to produce a honeycomb body with channels through which an exhaust gas can flow, the metallic foils may be coiled, wound and/or stacked, wherein in this case smooth and structured foils generally lie one on top of the other in an alternating fashion.

In this case, within the context of the invention, the smooth foils are not exclusively of planar construction but may if appropriate have microstructures (such as, for example, obstructions, turbulence generators, flow deflectors or other elements for flow manipulation) and/or passages which contribute to an increase in efficiency or an improvement in the homogenization of the exhaust-gas flow through the honeycomb body. The structured foils have, in particular a corrugated (sinusoidal/omega-shaped, triangular, polygonal, etc.) structure, wherein passages, obstructions, turbulence generators, flow deflectors or other elements for flow manipulation may also additionally be provided in this case. In this case, the microstructure of the smooth foil is formed so as to be smaller (that is to say with a smaller height transversely with respect to the foil) than the structure of the structured foils.

According to the invention, the at least one smooth foil has a different, that is to say greater or smaller, mean roughness than the at least one structured foil. In this case, the mean roughness of the at least one smooth foil is, in particular, greater than the roughness of the at least one structured foil.

The mean roughness values being considered herein are preferably roughnesses determined by using the tactile scanning method. That method is described, for example, in the article entitled "Rauheitsmessung an gewalzten Faltblechen" [Roughness Measurement of Rolled Folded Metal Sheets] in the periodical "Stahl and Eisen 109" [Steel and Iron 109] (Year 1989, no. 12, pages 589 and 590). In this case, the mean roughness is specified either as an arithmetic average value of the roughness ("mean roughness $R_a$") or as a "mean roughness depth $R_{max}$." In this case, the mean roughnesses referred to within the context of this invention are the representative roughnesses for the respective foil surface.

The differences between the mean roughness of the smooth foil and that of the structured foil can be established, in particular, in each case with regard to the mean roughness $R_a$ and/or the mean roughness depth $R_{max}$.

The mean roughness $R_a$ is defined as the arithmetic mean of the distance of measurement points on a surface to a center line, wherein within a reference length, the center line intersects the actual profile of the surface in such a way that the sum of the profile deviations in absolute terms in relation to the center line is at a minimum.

The mean roughness depth $R_{max}$ is defined as the average value of at least five values which correspond in each case, in the measurement of surface profiles, to the difference of the maximum and the minimum measurement point over one reference length in each case.

The mean roughness of the foils is determined without a coating, and is defined, in particular, in relation to foils without an oxide layer.

It is preferable in each case for the two values for $R_a$ and $R_{max}$ of the two foils to differ, and, in particular for those of the smooth foil to be greater.

The formation according to the invention of a honeycomb body from foils with different mean roughnesses has emerged from intensive tests which have shown that, by producing an increased mean roughness on only one foil, that is to say on the at least one smooth foil or on the at least one structured foil, the tendency for diffusion connections to form can be reduced.

In this case, in particular, the smooth foil lends itself to producing an increased roughness. For the production of a honeycomb body, the smooth foil and the structured foil generally have substantially the same dimensions with regard to width and length. The foil to be structured must accordingly be provided with a greater first or initial length than the smooth foil before the structuring process, in such a way that the reduction of the first length brought about by the processing step for producing the structure is compensated. Therefore, due to the production costs, increasing the roughness of smooth foils through the use of a specially-configured rolling process is less expensive.

In accordance with another feature of the invention, the honeycomb body is preferably constructed in such a way that the at least one smooth foil has a mean roughness $R_a$ of 0.3 μm to 0.7 μm (micrometers) and preferably a mean roughness $R_a$ of 0.5 μm to 0.7 μm. In this way, firstly the tendency of the foils to form diffusion connections is effectively suppressed, and secondly an adequately low roughness is provided in order to ensure the flow and wetting properties of the brazing material. A specified upper limit for the roughness ensures good flow and wetting behavior of the brazing material on the surfaces.

The presently conventional process for producing such foils through the use of rolling usually produces a mean roughness $R_a$ which lies in a range from 0.001 μm to 0.3 μm, in particular in a range from 0.1 μm to 0.3 μm. An increase in the mean roughness $R_a$ may be achieved through the use of suitably adapted rollers or rolling parameters. For this purpose, a treatment of the rollers in the final rolling step through the use of brushing or blasting (or similar measures) is, for example, necessary in order to provide foils with a mean roughness $R_a$ in a range of from 0.3 μm to 0.7 μm.

In accordance with a further feature of the honeycomb body of the invention, the at least one structured foil has a mean roughness $R_a$ of 0.001 to 0.3 μm. The mean roughness $R_a$ very particularly preferably lies in the range of from 0.1 to 0.2 μm. The flowability and wetting capability for adhesive or brazing material is therefore ensured, and inexpensive production is simultaneously made possible.

In accordance with an added feature of the invention, the roughnesses ($R_a$ and/or $R_{max}$) of the foils of the honeycomb body are preferably measured transversely with respect to the rolling direction of the foils. Due to the rolling process, it is possible for directional roughnesses to be produced in the foils. The maximum roughness of the surface is then determined through the use of the preferred measuring direction.

It is preferable for the production of the honeycomb body, for the foils in the honeycomb body to be disposed with the same alignment of the rolling direction.

The foils used for the production of a honeycomb body have a top side and a bottom side, which hereinafter are referred to as surfaces. In accordance with an additional feature of the invention, in one refinement of the honeycomb body, the at least one smooth foil has, on its two surfaces, a different oxide layer thickness than the structured foil.

In the stacked and/or coiled or wound honeycomb body, there are contact points between the individual foils and/or between the foils and other components, for example, a casing tube. Through the use of different known methods, it is possible in some regions to form fixed connecting points at contact points, for example through the use of the application of brazing material and subsequent heating. The brazed connections which are formed are not significantly impaired by a (thin) oxide layer. Secondly, the oxide layer in conjunction with the mean roughness $R_a$ of 0.3 to 0.7 μm prevents undesired diffusion connections from being formed, during the heating of the honeycomb body, at contact points which are not supposed to be connected. For that purpose, the oxide layer should be chosen to be sufficiently thick in such a way that the desired selective production of connecting points is promoted by the roughness and the oxide layer. In this case, too, the specified upper limit of the mean roughness should not be exceeded, in order to ensure that brazing connections are still reliably produced thereon.

In accordance with yet another feature of the invention, the at least one smooth foil of the honeycomb body preferably has a greater oxide layer thickness than the at least one structured foil. Since the oxide layer thickness is produced on the individual foils before the production of the structure of the honeycomb body, specially configured production steps are also possibly required herein in order to produce the desired properties. In particular, the oxide layer is produced through the use of a temperature treatment of the foils in air, for example in an annealing section, that is to say a conveyor-type device for the foils with heating measures, or in a furnace. In this case, too, an increase in the oxide layer thickness on the at least one smooth foil is preferable, taking into consideration the production costs.

In accordance with yet a further feature of the invention, the oxide layer thickness of the at least one smooth foil lies in a range of from 60 to 80 nm (nanometers). That range has proven to be particularly expedient for the production of honeycomb bodies having the desired properties, in particular for use in exhaust systems of motor vehicles. The oxide layer thus does not adversely affect the individual production steps, in particular the application and distribution of an adhesive or brazing material and the formation of brazing connections.

It has been found that the production of an increased oxide layer thickness on only one foil, in combination with the roughness ranges according to the invention, leads to a reduction in the formation of diffusion connections. For example, with conventional mean roughnesses $R_a$ of 0.001 to 0.3 μm and conventional oxide layer thicknesses of 20 to 40 nanometers on all of the foils, undesired diffusion connections are produced between the individual foils at approximately 30% of the contact points not to be connected by brazing. By forming at least one foil with a mean roughness $R_a$ of 0.3 to 0.7 μm and a mean oxide layer thickness of 60 to 80 nanometers, corresponding diffusion connections are produced only at a maximum of approximately 5% of the contact points.

The predetermined flexible properties of the honeycomb body are obtained through the use of such a structure of the honeycomb body, for example in conjunction with selective brazing material application in a printing (inkjet) process. At the same time, expenditure and production costs for the specific preparation remain acceptable, especially since usually only half of the foils required for the honeycomb body must be treated in advance.

Furthermore, it should be taken into consideration that different proportional amounts of smooth and corrugated foils (or foil sections) may be required for a honeycomb body. For example, smooth foils (or foil sections) account for only 30 and 40% of the surface area and weight respectively of the entire honeycomb body. If it is now required to implement particular (cost-causing) measures to set an increased roughness, then it is proposed herein that these be applied to the proportionally smaller part of the honeycomb body. Furthermore, a "subsequent" structuring of the untreated foil causing the set roughness to be changed again, is prevented in that way.

Regardless of this, it is pointed out in this case that an inverse configuration of the roughnesses of the smooth foil and of the structured foil may be expedient if appropriate, and fundamentally also falls within the scope of the invention. The at least one smooth foil then has a mean roughness $R_a$ of 0.001 to 0.3 micrometers, while the structured foil has a mean roughness $R_a$ of 0.3 to 0.7 micrometers.

In accordance with yet an added feature of the honeycomb body of the invention, the at least one smooth foil and/or the at least one structured foil contains 14 to 25% by weight of chromium and 3 to 7% by weight of aluminum. Iron is proposed as a base material. The aluminum contents specified herein serve, in particular, for the oxide layer formation, and the chromium contents serve, in particular, for corrosion resistance.

In accordance with yet an additional feature of the honeycomb body of the invention, connecting points are produced between adjacent foils by only brazing selectively in predetermined regions. Use is also made, in particular of the high-temperature vacuum brazing method. Despite the high temperature during the brazing process, no diffusion connections or only few connections or very weak diffusion connections are produced in the non-brazed regions. Those diffusion connections, however, do not significantly influence the thermal expansion and/or compression behavior of the honeycomb body during operation.

In accordance with again another feature of the invention, the honeycomb body is preferably provided with an additional coating which at least partially covers an oxide layer. In this case, the coating is, in particular, a washcoat and/or a coating with catalytically active materials. In this case, for use in the exhaust-gas purification of internal combustion engines, such an additional coating typically contains precious metals such as platinum or rhodium. The additional coating is applied after the production (brazing) of the honeycomb structure.

With the objects of the invention in view, there is also provided a method for producing a honeycomb body. The method comprises:

a) providing at least one smooth foil and at least one structured foil having different mean roughnesses;

b) forming an oxide layer with a first oxide layer thickness on the at least one smooth foil or on the at least one structured foil;

c) forming a honeycomb structure from the at least one smooth foil and the at least one structured foil;

d) inserting the honeycomb structure into a housing; and e) forming technical joining connections, such as brazing, sintering or welding.

The different roughnesses of the at least one smooth and structured foil are produced, as described, in each case, through the use of suitable rolling processes or rolling parameters, but may, in particular, also be produced through the use of retroactive treatment of the foils themselves by brushing or blasting.

The formation of the oxide layer is preferably carried out only on the at least one smooth foil (or on all of the smooth foils). In this case, the oxide layer is preferably produced in a continuous process in which the foil is unwound from a coil and conveyed through a heating device, for example an annealing section. The foils for producing the honeycomb body are subsequently cut to length and provided, or are layered and/or coiled or wrapped to form a honeycomb body directly after emerging from the heating device. In this case, the foils together form a honeycomb structure with a multiplicity of channels, which preferably run substantially parallel to one another. The honeycomb structure is preferably fixed (substantially only) through the use of brazing connections which the foils form with one another, wherein it is also preferable for the foils to all bear with their ends against the housing and to likewise be cohesively connected thereto (preferably jointly in step e).

In accordance with another mode of the invention, step b) of the method for forming an oxide layer with a first oxide layer thickness is preferably carried out at temperatures of at least 750° C. in air and over a time of 4 to 8 seconds. In this case, it is particularly advantageous for the oxide layer on all of the surfaces of the foil formed in that way to have an approximately uniform thickness with a tolerance of less than 10%, preferably less than 5%. It is important for the targeted selective production of connecting points and the targeted prevention of connections in other regions, for similar conditions to prevail at all of the contact points, for which reason low tolerances of the oxide layer are advantageous.

With the objects of the invention in view, there is concomitantly provided a motor vehicle, comprising an internal combustion engine, an exhaust system and a honeycomb body with the construction according to the invention or being produced by the method according to the invention.

Other features which are considered as characteristic for the invention are set forth in the appended claims, noting that the features specified individually in the dependent claims may be combined with one another in any desired technologically meaningful way and form further embodiments of the invention.

Although the invention is illustrated and described herein as embodied in a honeycomb body formed of metallic foils, a method for the production thereof and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. Furthermore, the features specified in the claims are rendered more precisely and explained in more detail in the description, with further preferred embodiments of the invention being presented.

DETAILED DESCRIPTION OF THE INVENTION

Figure 1:
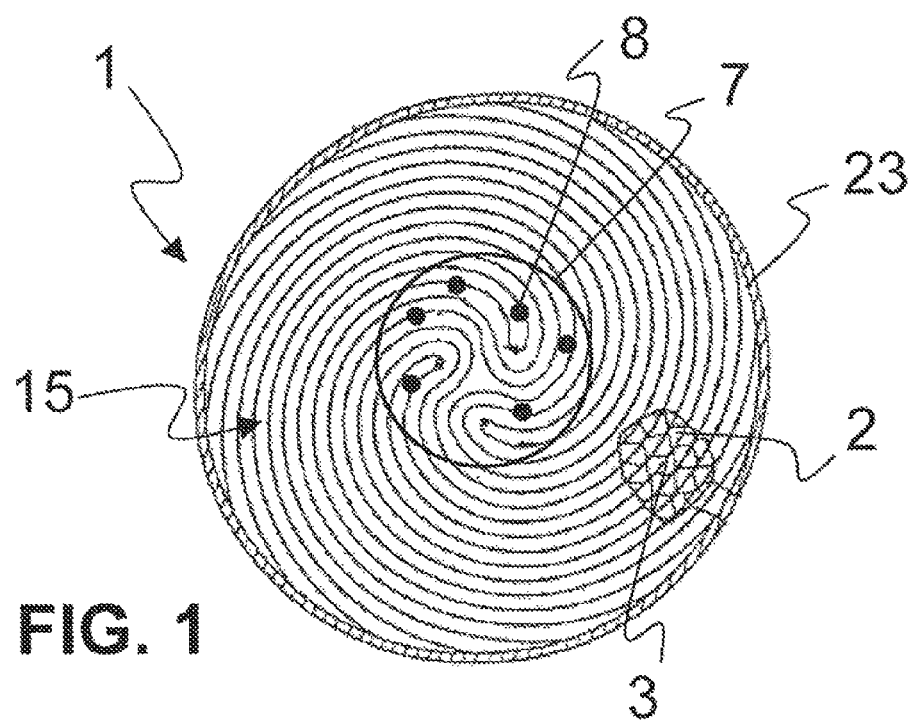
FIG. 1 is a diagrammatic, end-side cross-sectional view of a honeycomb body.

Referring now in detail to the figures of the drawings, which explain the invention and the technical field but to which the invention is not restricted, and first, particularly, to FIG. 1 thereof, there is seen a diagrammatic, end-side view of a honeycomb body 1 which is constructed from smooth foils 2 and structured foils 3 disposed in a housing 23. A honeycomb structure 15 in the housing 23 is produced from winding the foils 2, 3, but the exact shape thereof is not of importance in the present case. The invention may be applied to practically all known shapes of metallic honeycomb bodies. Indicated herein by way of example is a region 7 in which connecting points or locations 8 are produced between adjacent foils 2, 3, for example by brazing, in such a way that the honeycomb body 1 has a high degree of rigidity in this case. The region 7, within which individual connecting points 8 are selectively provided, may be positioned in any desired manner within the honeycomb body 1 and self-evidently also in relation to connections between the foils 2, 3 and the housing 23.

Figure 2:
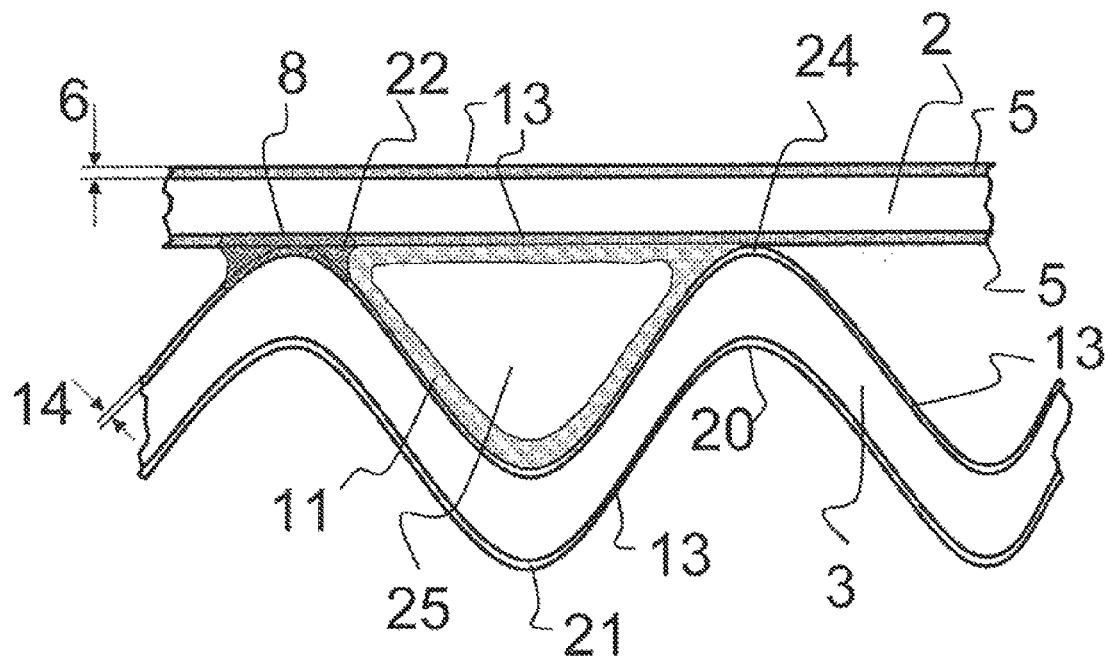
FIG. 2 is an enlarged, fragmentary, cross-sectional view showing contact points between smooth and structured foils.

FIG. 2 diagrammatically shows contact points 24 between smooth and structured foils 2, 3 within the honeycomb body 1. In this case, the smooth foil 2 is connected to the structured foil 3 in the region of a connecting point 8 through the use of brazing material 22. In this case, the structured foil 3 has a structure composed of wave peaks or crests 20 and wave troughs or valleys 21, through the use of which, in conjunction with the smooth foil 2, channels 25 through which a flow can pass are formed. In this case, the foils 2, 3 have oxide layers 13 on their two surfaces 5. The oxide layers 13, as shown in FIG. 2, are formed on the smooth foil 2 with a greater first oxide layer thickness 6 than a second oxide layer covering 14 of the structured foil 3. As a result of this increased first oxide layer thickness 6 on the smooth foil 2, a diffusion connection 10 (see FIG. 3) between the smooth foil 2 and the structured foil 3 is prevented. FIG. 2 also shows that a further coating 11 is provided on the foils 2, 3 within the channels 25 which are formed by the smooth foil 2 and the structured foil 3. The coating 11 includes, in particular, a so-called washcoat and/or catalytically active materials.

Figure 3:
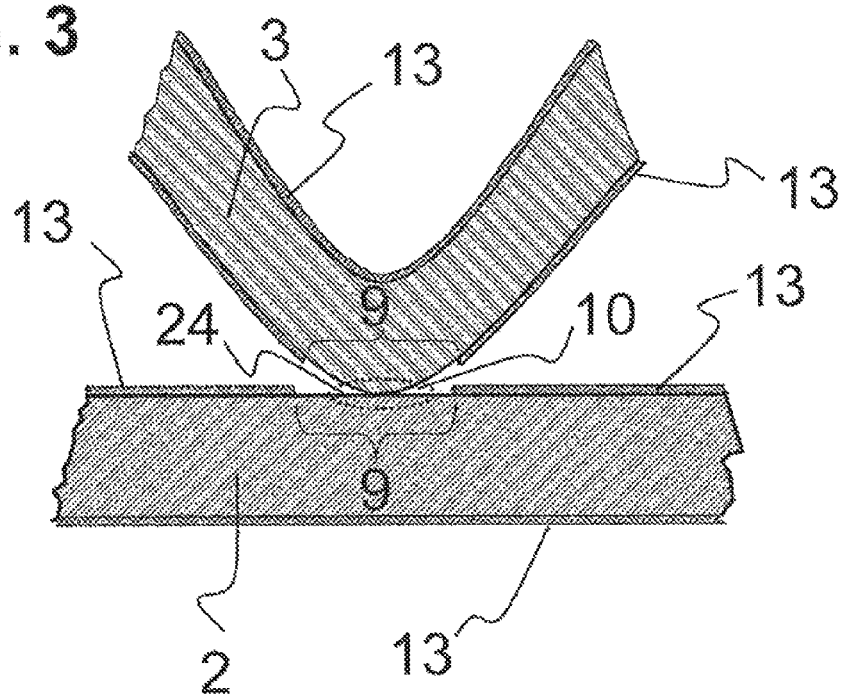
FIG. 3 is a view similar to FIG. 2 showing further contact points between smooth and structured foils.

FIG. 3 diagrammatically shows a situation at a contact point 24 between a smooth foil 2 and a structured foil 3 when the oxide layer 13 is formed only to an insufficient extent in a zone 9. In this case, "insufficient" means that the oxide layer 13 is either missing or formed so as to be too thin, in particular less than 50 nm (nanometers) on both foils. In that case, a diffusion connection 10 is formed at the contact point 24 when the honeycomb body 1 is heated up, for example in order to produce the brazing connections.

Figure 4:
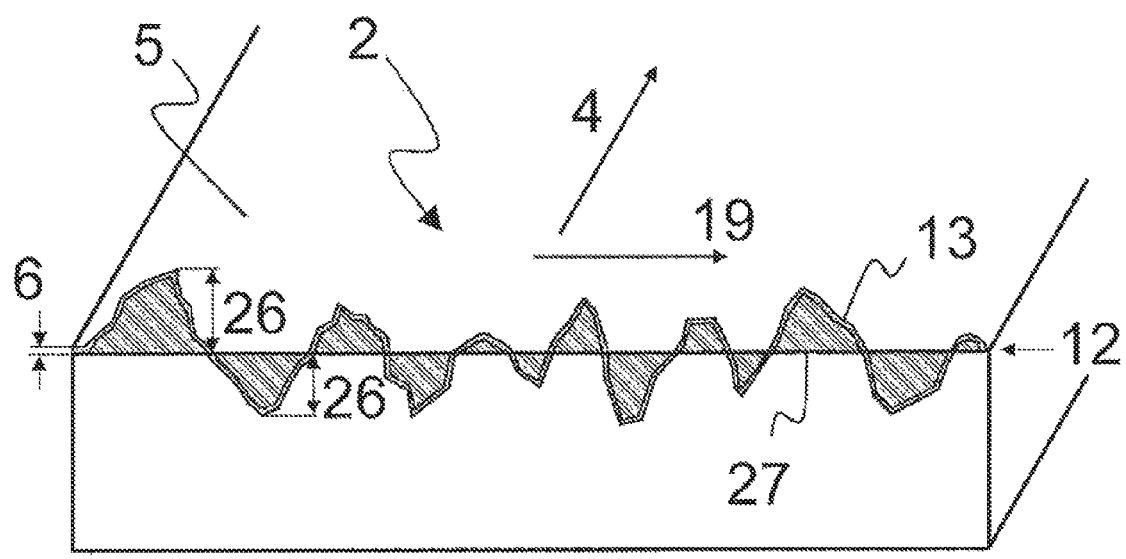
FIG. 4 is a fragmentary, partially-sectional, perspective view of a foil.

FIG. 4 diagrammatically shows, in a partially sectional perspective view and enlarged, but not to scale, a situation with regard to the oxide layer 13 and a roughness 12 on the surface 5 of a smooth foil 2. Such foils 2, 3 are typically produced in long strips by rolling, wherein in this case a rolling direction 4 is indicated by an arrow. A measuring direction 19, in which the roughness 12 is determined in this case, lies transversely with respect to the rolling direction 4. It can be seen that the oxide layer 13 with the first oxide layer thickness 6 has a small dimension in relation to the roughness 12 of the surface 5, that is to say it substantially follows the profile of the surface contour and does not even out the surface contour in any way. The roughness 12 is diagrammatically indicated by hatched areas. Peaks and depressions of different deviations 26 are formed on the surface 5 in relation to a center line 27, with a mean roughness $R_a$ indicating an average value for the deviations 26 of the peaks and troughs from the center line 27. There are various possibilities for influencing the roughnesses 12 on the surface 5. The roughnesses 12 may, for example, be reduced by polishing and increased by brushing or blasting using suitable tools.

Figure 5:
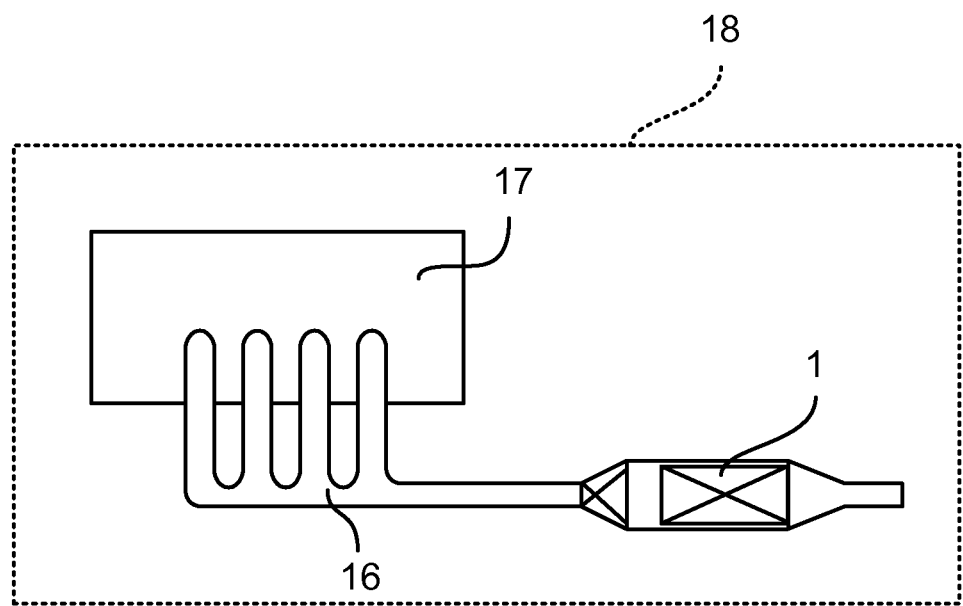
FIG. 5 is a plan view showing a configuration of a honeycomb body in an exhaust system.

FIG. 5 shows the use of a honeycomb body 1 within an exhaust system 16 of an internal combustion engine 17 of a motor vehicle 18.

The invention claimed is:

1. A honeycomb body, comprising: at least one metallic smooth foil; and at least one metallic structured foil; said at least one smooth foil having a different mean roughness than said at least one structured foil, one of said at least one smooth foil or said at least one structured foil having a mean roughness Ra of 0.3 to 0.7 micrometers and the other of said at least one smooth foil or said at least one structured foil having a mean roughness Ra of 0.001 to 0.3 micrometers for reducing diffusion connections between said foils, wherein said at least one smooth foil having a mean roughness which is greater than the mean roughness of said at least one structured foil.

2. The honeycomb body according to claim 1, wherein said at least one smooth foil has a mean roughness $R_a$ of 0.3 to 0.7 micrometers.

3. The honeycomb body according to claim 2, wherein said at least one structured foil has a mean roughness $R_a$ of 0.001 to 0.3 micrometers.

4. The honeycomb body according to claim 1, wherein said at least one structured foil has a mean roughness $R_a$ of 0.001 to 0.3 micrometers.

5. The honeycomb body according to claim 1, wherein said roughnesses of said foils are measured transversely relative to a rolling direction.

6. The honeycomb body according to claim 1, wherein said at least one smooth foil has two surfaces, oxide layers are disposed on said two surfaces of said at least one smooth foil and on said at least one structured foil, and said oxide layers on said two surfaces of said at least one smooth foil have a different first oxide layer thickness than said oxide layer on said at least one structured foil.

7. The honeycomb body according to claim 6, wherein said oxide layers on said two surfaces of said at least one smooth foil have a greater first oxide layer thickness than said oxide layer on said at least one structured foil.

8. The honeycomb body according to claim 7, wherein said first oxide layer thickness of said oxide layer on said at least one smooth foil lies in a range of from 60 to 80 nanometers.

9. The honeycomb body according to claim 1, wherein at least one of said at least one smooth foil or said at least one structured foil contains 14 to 25% by weight of chromium and 3 to 7% by weight of aluminum.

10. The honeycomb body according to claim 1, which further comprises connecting points produced between adjacent foils for brazing selectively in only predetermined regions.

11. The honeycomb body according to claim 1, which further comprises an oxide layer disposed on said foils, and an additional coating at least partially covering said oxide layer.

12. A motor vehicle, comprising:
an internal combustion engine;
an exhaust system receiving exhaust gas from said internal combustion engine; and
a honeycomb body according to claim 1 associated with said exhaust system.

13. A method for producing a honeycomb body, the method comprising the following steps:
a) providing at least one smooth foil and at least one structured foil having different mean roughnesses, one of the at least one smooth foil or the at least one structured foil having a mean roughness Ra of 0.3 to 0.7 micrometers and the other of the at least one smooth foil or the at least one structured foil having a mean roughness Ra of 0.001 to 0.3 micrometers for reducing diffusion connections between the foils, wherein the least one smooth foil has a mean roughness which is greater than the mean roughness of the at least one structured foil;
b) forming an oxide layer with a first oxide layer thickness on the at least one smooth foil or on the at least one structured foil;
c) forming a honeycomb structure from the at least one smooth foil and the at least one structured foil;
d) inserting the honeycomb structure into a housing; and
e) forming technical joining connections at least at some of the foils.

14. The method according to claim 13, which further comprises carrying out step b) at temperatures of at least 750° C. in air over a time period of 4 to 8 seconds.

15. A motor vehicle, comprising:
an internal combustion engine;
an exhaust system receiving exhaust gas from said internal combustion engine; and
a honeycomb body produced according to claim 13 and associated with said exhaust system.

* * * * *